O. Ernst,
Essence Extractor.
No. 35,747. Patented July 1. 1862.
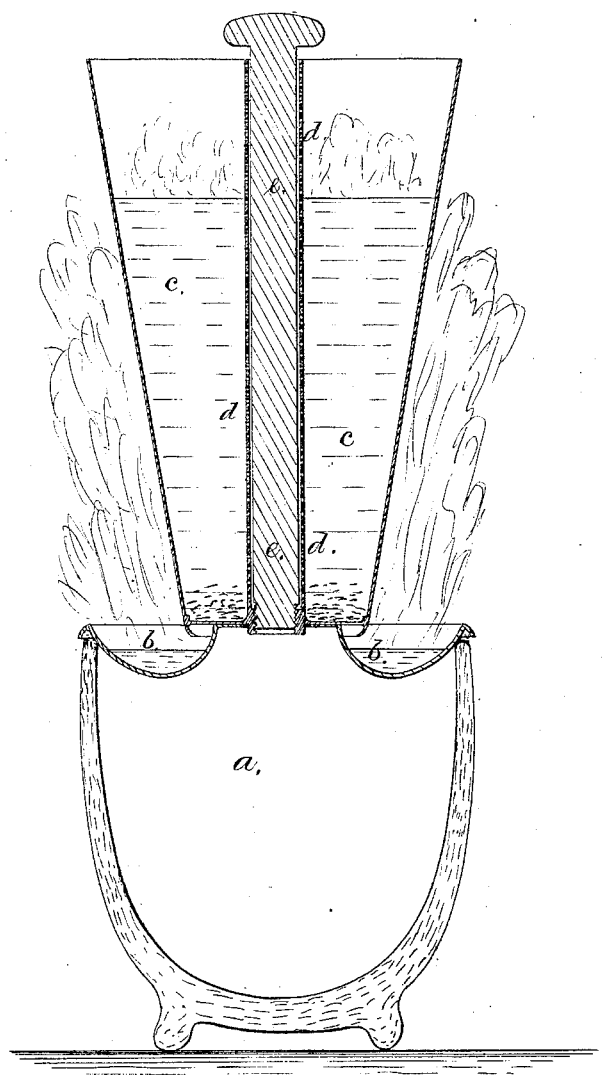
Witnesses.
Lemuel W. Serrell
Thos. Geo. Harold
Otto Ernst

UNITED STATES PATENT OFFICE.

OTTO ERNST, OF NEW YORK, N. Y.

IMPROVED VESSEL FOR EXTRACTING ESSENCES.

Specification forming part of Letters Patent No. 35,747, dated July 1, 1862.

*To all whom it may concern:*

Be it known that I, OTTO ERNST, of the city and State of New York, have invented and made a certain new and useful Improvement in Portable Essence-Extractors; and I do hereby declare the following to be a full, clear, and exact description of the said invention, reference being had to the annexed drawing, making part of this specification, wherein I have shown a vertical section of my said essence-extractor as in use.

Small boilers have heretofore been made by the employment of a conical cup over a small vessel containing alcohol or other inflammable liquid, in which cup water could be heated or boiled for any domestic purpose without having to light a fire in a stove.

My invention consists in a pipe strainer or filter and a stop or plug, in combination with such boiler, whereby I produce a new article of manufacture adapted to extracting tea, coffee, or other substances and straining the same in the act of running into a cup or other receptacle upon which the portable extractor is placed.

In the drawing, *a* represents a cup or other receptacle, upon which is placed the vessel *b* to contain alcohol or other inflammable material. *c* is a conical cup, the base of which rests on the vessel *a*. *d* is a pipe-shaped strainer, formed of wire-gauze or perforated sheet metal, and *e* is a plug passing through said tube and closing the hole at the bottom; or any other suitable valve or stop might be provided. The vessel *b* is perforated in its center beneath the pipe *d*.

I place coffee, tea, or other articles in the cup *c* with the required liquid, ignite the alcohol in the vessel *b*, and the cup and its contents are speedily heated, and when the extract has been made, by drawing up the plug *e* the liquid runs into the cup *a* beneath, while all refuse or grounds are left in the vessel *c*, and the strainer *d* is not obstructed because of the extent of perforated surface and the fact that refuse matters settle down and the liquid runs off from the upper portion of the liquid as it falls.

My portable essence-extractor is a simple article that is very effective and a great convenience for making a cup of tea or coffee with but little trouble and entirely free from leaves or grounds.

The conical cup *c* and vessel *b* may be made separately or attached together, as convenience may dictate.

What I claim, and desire to secure by Letters Patent, is—

The pipe-shaped strainer *d*, applied in the cup or vessel *c*, in combination with the vessel *b* and plug or stop to the pipe *d*, in the manner and for the purposes specified.

In witness whereof I have hereunto set my signature this 16th day of May, 1862.

OTTO ERNST.

Witnesses:
LEMUEL W. SERRELL,
THOS. GEO. HAROLD.